(12) United States Patent
Kawada

(10) Patent No.: US 10,497,151 B2
(45) Date of Patent: Dec. 3, 2019

(54) STORAGE MEDIUM, INFORMATION PROCESSING APPARATUS, INFORMATION PROCESSING SYSTEM AND INFORMATION PROCESSING METHOD

(71) Applicants: NINTENDO CO., LTD., Kyoto (JP); GAME FREAK Inc., Tokyo (JP)

(72) Inventor: Koji Kawada, Tokyo (JP)

(73) Assignees: NINTENDO CO., LTD., Kyoto (JP); GAME FREAK INC., Tokyo (JP)

( * ) Notice: Subject to any disclaimer, the term of this patent is extended or adjusted under 35 U.S.C. 154(b) by 26 days.

(21) Appl. No.: 15/793,157

(22) Filed: Oct. 25, 2017

(65) Prior Publication Data
US 2018/0114344 A1 Apr. 26, 2018

(30) Foreign Application Priority Data
Oct. 25, 2016 (JP) .................................. 2016-208450

(51) Int. Cl.
  *G06T 15/20* (2011.01)
  *G06T 11/00* (2006.01)
  *G06T 15/04* (2011.01)
(52) U.S. Cl.
  CPC ............ *G06T 11/001* (2013.01); *G06T 15/04* (2013.01); *G06T 15/20* (2013.01)
(58) Field of Classification Search
  CPC ........ G06T 11/001; G06T 15/04; G06T 15/20
  USPC ....................................................... 345/589
  See application file for complete search history.

(56) References Cited

U.S. PATENT DOCUMENTS

| 2002/0004421 | A1 | 1/2002 | Itai | |
| 2002/0044152 | A1* | 4/2002 | Abbott, III | G06T 11/00 345/629 |
| 2011/0169853 | A1 | 7/2011 | Oiwa et al. | |
| 2012/0212405 | A1* | 8/2012 | Newhouse | G02B 27/017 345/156 |
| 2013/0293589 | A1* | 11/2013 | Hwang | G06F 3/0488 345/666 |
| 2014/0351728 | A1* | 11/2014 | Seo | H04M 1/72569 715/766 |

(Continued)

FOREIGN PATENT DOCUMENTS

| CN | 104520785 | 4/2015 |
| JP | 2002-024857 | 1/2002 |
| JP | 2009-282814 | 12/2009 |

(Continued)

*Primary Examiner* — Jin Ge
(74) *Attorney, Agent, or Firm* — Nixon & Vanderhye PC

(57) ABSTRACT

A non-limiting example game apparatus includes a display device, and a card display screen including an image of a card object is displayed on the display device. The image of the card object is constituted by a character image arranged in the front most and a composite image that is arranged at a back thereof, and with the composite image is obtained by combining a color change image, a background image and a pattern image. The color change image includes a plurality of polygons, and a color of each of vertices is set so as to cyclically change according to an attitude of the game apparatus and respective vertices positions of the plurality of polygons. The color change image and the background image are combined with each other, so that brightness of the background image cyclically changes according to the color of the color change image that cyclically changes.

15 Claims, 17 Drawing Sheets

(56) References Cited

U.S. PATENT DOCUMENTS

2015/0145883 A1\* 5/2015 Marti .................. G09G 3/20
 345/592
2016/0189429 A1\* 6/2016 Mallinson .............. G02B 26/10
 345/633

FOREIGN PATENT DOCUMENTS

| JP | 2010-009292 | 1/2010 |
| JP | 2011-145795 | 7/2011 |
| JP | 2014/174649 | 9/2014 |
| WO | 2013/162564 | 10/2013 |
| WO | 2015/042048 | 3/2015 |

\* cited by examiner

FIG. 2
CARD DISPLAY SCREEN  100
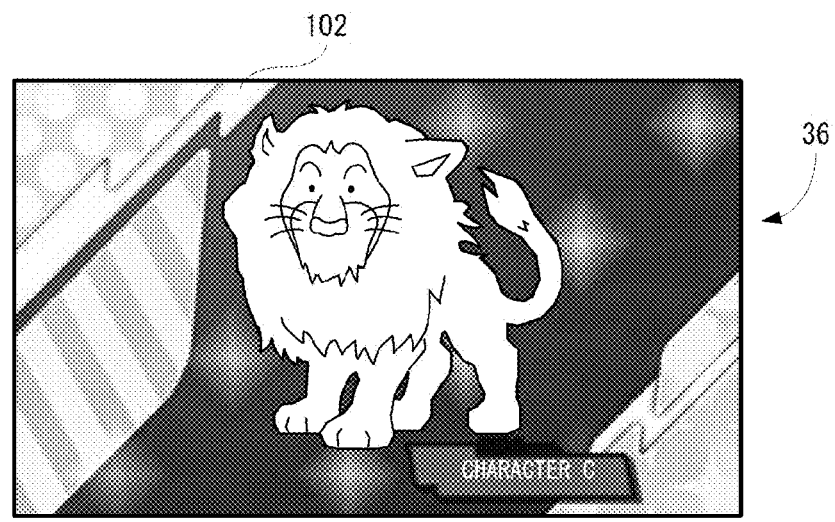
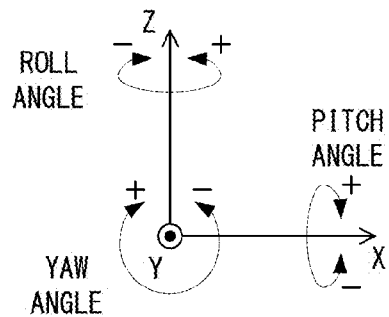
THREE-DIMENSIONAL COORDINATES
SYSTEM SET IN GAME APPARATUS FIG. 4A    CARD OBJECT 102
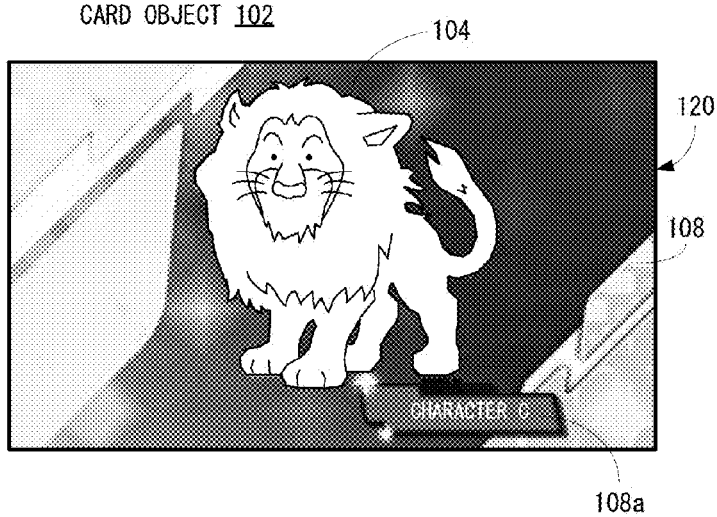
FIG. 4B    CARD OBJECT 102
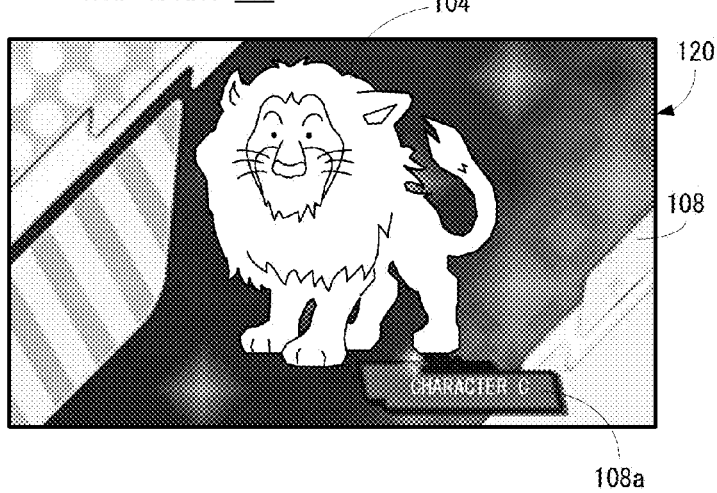
FIG. 5
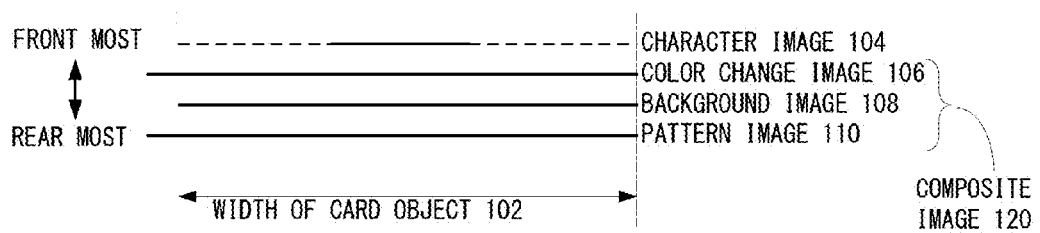

FIG. 6A    COLOR CHANGE IMAGE 106 CONSTITUTING CARD OBJECT 102
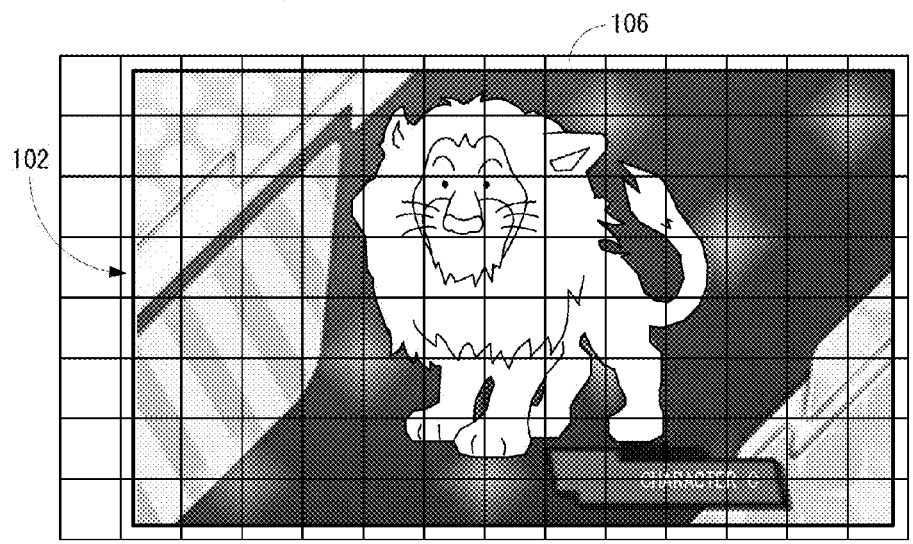
FIG. 6B    COLOR CHANGE IMAGE 106
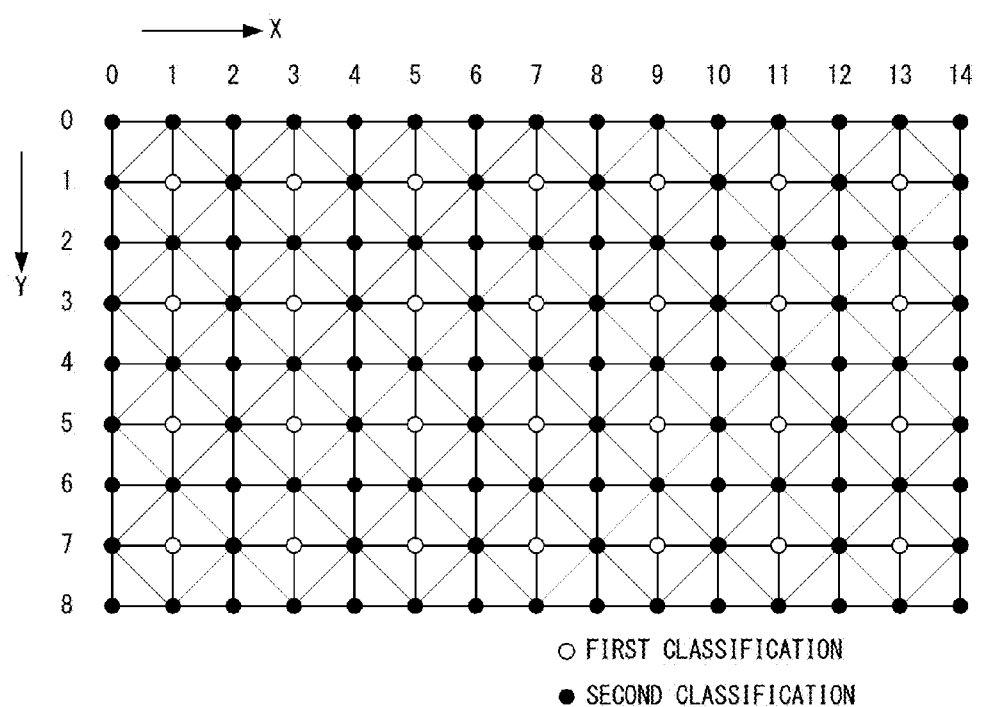
○ FIRST CLASSIFICATION
● SECOND CLASSIFICATION PATTERN TO BE SET IN DIVIDED REGION 110a OF PATTERN IMAGE 110

PATTERN IMAGE 110

FIG. 8

PARAMETERS

| | COLOR | GYRO ANGLE | MIN. VALUE Min | MAX. VALUE Max | COEFFICIENT f | INIT. PHASE isou | COEFFICIENT isou_x | COEFFICIENT isou_y |
|---|---|---|---|---|---|---|---|---|
| FIRST CLASSIFI- CATION | R | AVERAGE VALUE | -1 | 0.2 | 30 | 60 | 80 | 80 |
| | G | AVERAGE VALUE | -1 | 0.6 | 30 | 80 | 80 | 80 |
| | B | AVERAGE VALUE | -2 | 0.8 | 30 | 60 | 80 | 80 |
| SECOND CLASSIFI- CATION | R | AVERAGE VALUE | 0 | 0 | 50 | 100 | 25 | 20 |
| | G | AVERAGE VALUE | -1.6 | 0.5 | 50 | 240 | 15 | 10 |
| | B | AVERAGE VALUE | -1.6 | 0.7 | 50 | 100 | 30 | 10 |

FIG. 10

CALCULATION RESULT IN CASE OF FIRST ATTITUDE

| COORDINATES | COLOR R | COLOR G | COLOR B |
|---|---|---|---|
| (0, 0) | 0 | 84 | 0 |
| (0, 1) | 0 | 55 | 0 |
| (0, 2) | 0 | 20 | 0 |
| (0, 3) | 0 | 0 | 0 |
| (0, 4) | 0 | 0 | 0 |
| (0, 5) | 0 | 0 | 44 |
| (0, 6) | 0 | 0 | 85 |
| (0, 7) | 0 | 0 | 119 |
| (0, 8) | 0 | 0 | 146 |
| (1, 0) | 0 | 38 | 0 |
| (1, 1) | 0 | 0 | 0 |
| (1, 2) | 0 | 0 | 44 |
| (1, 3) | 0 | 0 | 0 |
| (1, 4) | 0 | 0 | 119 |
| (1, 5) | 0 | 2 | 47 |
| (1, 6) | 0 | 0 | 165 |
| (1, 7) | 0 | 0 | 0 |
| (1, 8) | 0 | 0 | 178 |

| COORDINATES | COLOR R | COLOR G | COLOR B |
|---|---|---|---|
| (2, 0) | 0 | 0 | 85 |
| (2, 1) | 0 | 0 | 119 |
| (2, 2) | 0 | 0 | 146 |
| (2, 3) | 0 | 0 | 165 |
| (2, 4) | 0 | 0 | 176 |
| (2, 5) | 0 | 0 | 178 |
| (2, 6) | 0 | 0 | 170 |
| (2, 7) | 0 | 0 | 155 |
| (2, 8) | 0 | 0 | 131 |
| (3, 0) | 0 | 0 | 165 |
| (3, 1) | 0 | 0 | 0 |
| (3, 2) | 0 | 0 | 178 |
| (3, 3) | 0 | 2 | 47 |
| (3, 4) | 0 | 0 | 155 |
| (3, 5) | 0 | 0 | 0 |
| (3, 6) | 0 | 0 | 99 |
| (3, 7) | 45 | 116 | 190 |
| (3, 8) | 0 | 0 | 18 |

FIG. 11

CALCULATION RESULT IN CASE OF FIRST ATTITUDE

| COORDINATES | COLOR R | COLOR G | COLOR B | COORDINATES | COLOR R | COLOR G | COLOR B |
|---|---|---|---|---|---|---|---|
| (4, 0) | 0 | 0 | 170 | (7, 0) | 0 | 0 | 0 |
| (4, 1) | 0 | 0 | 155 | (7, 1) | 0 | 0 | 0 |
| (4, 2) | 0 | 0 | 131 | (7, 2) | 0 | 0 | 0 |
| (4, 3) | 0 | 0 | 99 | (7, 3) | 45 | 116 | 190 |
| (4, 4) | 0 | 0 | 61 | (7, 4) | 0 | 0 | 0 |
| (4, 5) | 0 | 0 | 18 | (7, 5) | 0 | 0 | 0 |
| (4, 6) | 0 | 0 | 0 | (7, 6) | 0 | 0 | 0 |
| (4, 7) | 0 | 0 | 0 | (7, 7) | 37 | 152 | 172 |
| (4, 8) | 0 | 0 | 0 | (7, 8) | 0 | 0 | 0 |
| (5, 0) | 0 | 0 | 99 | (9, 0) | 0 | 0 | 0 |
| (5, 1) | 0 | 2 | 47 | (9, 1) | 45 | 116 | 190 |
| (5, 2) | 0 | 0 | 18 | (9, 2) | 0 | 0 | 0 |
| (5, 3) | 0 | 0 | 0 | (9, 3) | 0 | 0 | 0 |
| (5, 4) | 0 | 0 | 0 | (9, 4) | 0 | 0 | 0 |
| (5, 5) | 45 | 116 | 190 | (9, 5) | 37 | 152 | 172 |
| (5, 6) | 0 | 0 | 0 | (9, 6) | 0 | 0 | 0 |
| (5, 7) | 0 | 0 | 0 | (9, 7) | 0 | 0 | 0 |
| (5, 8) | 0 | 0 | 0 | (9, 8) | 0 | 0 | 0 |

FIG. 12

CALCULATION RESULT IN CASE OF FIRST ATTITUDE

| COORDINATES | COLOR R | COLOR G | COLOR B | COORDINATES | COLOR R | COLOR G | COLOR B |
|---|---|---|---|---|---|---|---|
| (11, 0) | 0 | 0 | 0 | (13, 0) | 0 | 0 | 0 |
| (11, 1) | 0 | 0 | 0 | (13, 1) | 37 | 152 | 172 |
| (11, 2) | 0 | 0 | 0 | (13, 2) | 0 | 0 | 44 |
| (11, 3) | 37 | 152 | 172 | (13, 3) | 0 | 0 | 0 |
| (11, 4) | 0 | 0 | 0 | (13, 4) | 0 | 0 | 119 |
| (11, 5) | 0 | 0 | 0 | (13, 5) | 0 | 92 | 2 |
| (11, 6) | 0 | 0 | 0 | (13, 6) | 0 | 0 | 165 |
| (11, 7) | 0 | 92 | 2 | (13, 7) | 0 | 0 | 0 |
| (11, 8) | 0 | 0 | 44 | (13, 8) | 0 | 24 | 178 |
| (12, 0) | 0 | 0 | 0 | (14, 0) | 0 | 0 | 85 |
| (12, 1) | 0 | 0 | 0 | (14, 1) | 0 | 0 | 119 |
| (12, 2) | 0 | 0 | 0 | (14, 2) | 0 | 0 | 146 |
| (12, 3) | 0 | 0 | 0 | (14, 3) | 0 | 0 | 165 |
| (12, 4) | 0 | 0 | 0 | (14, 4) | 0 | 0 | 176 |
| (12, 5) | 0 | 0 | 44 | (14, 5) | 0 | 0 | 178 |
| (12, 6) | 0 | 0 | 85 | (14, 6) | 0 | 5 | 170 |
| (12, 7) | 0 | 0 | 119 | (14, 7) | 0 | 42 | 155 |
| (12, 8) | 0 | 0 | 146 | (14, 8) | 0 | 73 | 131 |

FIG. 13

CALCULATION RESULT IN CASE OF SECOND ATTITUDE

| COORDINATES | COLOR R | COLOR G | COLOR B | COORDINATES | COLOR R | COLOR G | COLOR B |
|---|---|---|---|---|---|---|---|
| (5, 0) | 0 | 0 | 0 | (7, 0) | 0 | 0 | 0 |
| (5, 1) | 0 | 0 | 0 | (7, 1) | 0 | 0 | 0 |
| (5, 2) | 0 | 0 | 0 | (7, 2) | 0 | 29 | 0 |
| (5, 3) | 0 | 0 | 0 | (7, 3) | 23 | 69 | 140 |
| (5, 4) | 0 | 0 | 0 | (7, 4) | 0 | 90 | 6 |
| (5, 5) | 23 | 69 | 140 | (7, 5) | 0 | 0 | 0 |
| (5, 6) | 0 | 63 | 0 | (7, 6) | 0 | 122 | 90 |
| (5, 7) | 0 | 0 | 0 | (7, 7) | 50 | 147 | 202 |
| (5, 8) | 0 | 110 | 0 | (7, 8) | 0 | 123 | 149 |
| (6, 0) | 0 | 0 | 0 | (8, 0) | 0 | 11 | 0 |
| (6, 1) | 0 | 0 | 0 | (8, 1) | 0 | 47 | 6 |
| (6, 2) | 0 | 0 | 0 | (8, 2) | 0 | 77 | 51 |
| (6, 3) | 0 | 11 | 0 | (8, 3) | 0 | 101 | 90 |
| (6, 4) | 0 | 47 | 0 | (8, 4) | 0 | 117 | 123 |
| (6, 5) | 0 | 77 | 0 | (8, 5) | 0 | 126 | 149 |
| (6, 6) | 0 | 101 | 0 | (8, 6) | 0 | 126 | 167 |
| (6, 7) | 0 | 117 | 6 | (8, 7) | 0 | 119 | 177 |
| (6, 8) | 0 | 126 | 51 | (8, 8) | 0 | 103 | 177 |

FIG. 14

CALCULATION RESULT IN CASE OF THIRD ATTITUDE

| COORIDNATES | COLOR R | COLOR G | COLOR B | COORDINATES | COLOR R | COLOR G | COLOR B |
|---|---|---|---|---|---|---|---|
| (5, 0) | 0 | 121 | 63 | (7, 0) | 0 | 56 | 175 |
| (5, 1) | 50 | 143 | 203 | (7, 1) | 0 | 0 | 0 |
| (5, 2) | 0 | 85 | 132 | (7, 2) | 0 | 0 | 145 |
| (5, 3) | 0 | 0 | 0 | (7, 3) | 12 | 137 | 114 |
| (5, 4) | 0 | 22 | 171 | (7, 4) | 0 | 0 | 83 |
| (5, 5) | 12 | 137 | 114 | (7, 5) | 0 | 0 | 0 |
| (5, 6) | 0 | 0 | 175 | (7, 6) | 0 | 0 | 0 |
| (5, 7) | 0 | 0 | 0 | (7, 7) | 0 | 43 | 0 |
| (5, 8) | 0 | 0 | 145 | (7, 8) | 0 | 0 | 0 |
| (6, 0) | 0 | 97 | 156 | (8, 0) | 0 | 3 | 117 |
| (6, 1) | 0 | 72 | 171 | (8, 1) | 0 | 0 | 83 |
| (6, 2) | 0 | 40 | 178 | (8, 2) | 0 | 0 | 42 |
| (6, 3) | 0 | 3 | 175 | (8, 3) | 0 | 0 | 0 |
| (6, 4) | 0 | 0 | 164 | (8, 4) | 0 | 0 | 0 |
| (6, 5) | 0 | 0 | 145 | (8, 5) | 0 | 0 | 0 |
| (6, 6) | 0 | 0 | 117 | (8, 6) | 0 | 0 | 0 |
| (6, 7) | 0 | 0 | 83 | (8, 7) | 0 | 0 | 0 |
| (6, 8) | 0 | 0 | 42 | (8, 8) | 0 | 0 | 0 |

STORAGE MEDIUM, INFORMATION PROCESSING APPARATUS, INFORMATION PROCESSING SYSTEM AND INFORMATION PROCESSING METHOD

CROSS REFERENCE OF RELATED APPLICATION

The disclosure of Japanese patent application No. 2016-208450 filed on Oct. 25, 2016 is incorporated by reference.

FIELD

This application explains a storage medium, information processing apparatus, information processing system and information processing method, which generating an image according to an attitude of a predetermined apparatus a user operates.

SUMMARY

It is a primary object to provide a novel storage medium, information processing apparatus, information processing system and information processing method.

Moreover, it is another object to provide a storage medium, information processing apparatus, information processing system and information processing method, capable of making an image look luxurious in accordance with a way of viewing of a user.

A first embodiment is a non-transitory computer readable storage medium storing an information processing program to be executed by a computer of an information processing apparatus that displays a first image on a display portion, wherein the information processing program causes one or more processors of the computer to perform: an attitude calculation step, a color control step, and an image generation step. In the attitude calculation step, an attitude of an apparatus that a user operates is calculated. In the color control step, a color is set for a display object so as to change according to a predetermined transition in accordance with an attitude and a display position or a position within the display object. In the image generation step, the first image including the display object is generated.

According to the first embodiment, since the color in the display object is set so as to change according to the predetermined transition that is determined in advance in accordance with the attitude of the predetermined apparatus user operates and the display position or the position within the display object, in the first image, a color (brightness) of the display object at least is changed. That is, according to a relative positional relationship between the display device and the user, the image is changed so that the display object shines glitteringly. Thus, it is possible to show the image luxuriously according to a way of viewing of the user.

A second embodiment is the storage medium according to the first embodiment, wherein the color control step causes the one or more processors to set a color so as to change cyclically according to the attitude and the display position or the position within the display object.

According to the second embodiment, since the color is set so as to be changed cyclically, the brightness can be changed even at the same display position. Therefore, the predetermined display object is cyclically changed so as to shine glitteringly.

A third embodiment is according to the second embodiment, wherein the color control step causes the one or more processors to set a color based on a sine function or a cosine function that adds a parameter indicating the attitude and the display position or the position within the display object to a phase.

According to the third embodiment, since a sine function or a cosine function is used, it is possible to change a color within the display object cyclically.

A fourth embodiment is according to the third embodiment, wherein the color control step causes the one or more processors not to set a color when a value of a sine function or a cosine function is equal to or less than a predetermined value.

A fifth embodiment is according to the first embodiment, wherein the color control step causes the one or more processors to set a color based on a transition that is determined in advance for each color component. For example, a color value is calculated by the transition that is determined in advance for each of the color R, G, B.

A sixth embodiment is according to the first embodiment, wherein the image generation step causes the one or more processors to generate the first image including a second image for a predetermined character in addition to the predetermined display object.

According to the sixth embodiment, it is possible to make the predetermined character look luxurious by making the predetermined display object glittering.

A seventh embodiment is according to the first embodiment, wherein the image generation step causes the one or more processors to generate the first image so that a predetermined third image is combined with a color that is set in the color control step with respect to the predetermined display object.

According to the seventh embodiment, since the third predetermined image is combined, by attaching a pattern to the third image, for example, it is possible to express the pattern to the first image according to the change of the brightness of the predetermined display object.

An eighth embodiment is according to the first embodiment, wherein the predetermined display object is constituted by a polygon model in a virtual space, and the color control step causes the one or more processors to determine a color of each of vertices polygons of the predetermined display object based on a transition that is determined in advance and to determine a color of another portion through interpolation between vertices.

According to the eighth embodiment, since the predetermined display object is constituted by the polygon model, if the color of each of the vertices is calculated, the color of portions other than the vertex of the polygon can be interpolated using the color between vertices by a dedicated circuit, for example, and therefore, a color setting is simple.

A ninth embodiment is according to the eighth embodiment, wherein a plurality of correspondence relationships of a color corresponding to the attitude and a vertex position are determined, and the color control step causes the one or more processors to determine a color corresponding to the attitude and the vertex position based on one of the correspondence relationships determined for each vertex.

According to the ninth embodiment, since the plurality of correspondence relationships of the color corresponding to the attitude and the vertex position are determined, it is possible to make a transition of color differ depending on the correspondence relationship.

A tenth embodiment is according to the ninth embodiment, wherein the correspondence relationship is set so that a color is cyclically changed based on the attitude and the vertex position, and among the plurality of correspondence relationships, at least two of the correspondence relationships are different in a frequency of a color change. Therefore, the number of times that a waveform goes up and down during a time that the phase changes by only a predetermined angle differs.

According to the tenth embodiment, since the number of times that a waveform goes up and down during a time that the phase changes by only a predetermined angle differs, it is possible to make a transition of color differ.

An eleventh embodiment is according to the first embodiment, wherein the predetermined apparatus is an information processing apparatus.

According to the eleventh embodiment, the color of the predetermined display object can be changed according to the attitude of the information processing apparatus.

A twelfth embodiment is a non-transitory computer readable storage medium storing an information processing program to be executed by a computer of an information processing apparatus that displays a first image on a display portion, wherein the information processing program causes one or more processors of the computer to perform: a relative position calculation step, a color control step, and an image generation step. In the relative position calculation step, a relative positional relationship between a display portion and a user is calculated. In the color control step, a color is set for a display object so as to change according to a predetermined transition in accordance with the relative positional relationship and a display position or a position within the display object. In the image generation step, the first image including the display object is generated.

A thirteenth embodiment is an information processing apparatus that displays a first image on a display portion, comprising: an attitude calculation portion configured to calculate an attitude of an apparatus that a user operates; a color control portion configured to set a color for a display object so as to change according to a predetermined transition in accordance with an attitude and a display position or a position within the display object; and an image generation portion configured to generate the first image including the display object.

A fourteenth embodiment is an information processing system that displays a first image on a display portion, comprising: an attitude calculation portion configured to calculate an attitude of an apparatus that a user operates; a color control portion configured to set a color for a display object so as to change according to a predetermined transition in accordance with an attitude and a display position or a position within the display object; and an image generation portion configured to generate the first image including the display object.

A fifteenth embodiment is an information processing method of a computer that displays a first image on a display portion, wherein the computer performs steps of: (a) calculating an attitude of an apparatus that a user operates; (b) setting a color for a display object so as to change according to a predetermined transition in accordance with an attitude and a display position or a position within the display object; and (c) generating the first image including the display object.

According to one of the twelfth to fifteenth embodiments, as similar to the first embodiment, it is possible to show the image luxuriously according to the way of viewing of the user.

The above described objects and other objects, features, aspects and advantages of the embodiments will become more apparent from the following detailed description when taken in conjunction with the accompanying drawings.

BRIEF DESCRIPTION OF THE DRAWINGS

FIG. 2 is an illustration view showing a non-limiting example card display screen that is displayed on a display device of the game apparatus shown in FIG. 1.

FIG. 4A is an illustration view showing a non-limiting example third display of a card object shown in FIG. 2, and FIG. 4B is an illustration view showing a non-limiting example fourth display of the card object shown in FIG. 2.

FIG. 5 is an illustration view showing non-limiting example structure of a card object.

FIG. 6A is an illustration view showing a non-limiting example color change image constituting the card object, and FIG. 6B is an illustration view non-limiting example specific structure of the color change image.

FIG. 8 is an illustration view showing a non-limiting example table of parameters to be set to an equation for calculating a color of each of vertices of a plurality of polygons constituting the color change image.

FIG. 10 is an illustration view showing a non-limiting example calculation result obtained by calculating colors of a part of vertices of the plurality of polygons constituting the color change image in case of first attitude.

FIG. 11 is an illustration view showing a non-limiting example calculation result obtained by calculating colors of another part of the vertices of the plurality of polygons constituting the color change image in the case of first attitude.

FIG. 12 is an illustration view showing a non-limiting example calculation result obtained by calculating colors of a further part of the vertices of the plurality of polygons constituting the color change image in the case of first attitude.

FIG. 13 is an illustration view showing a non-limiting example calculation result obtained by calculating colors of a part of vertices of the plurality of polygons constituting the color change image in case of second attitude.

FIG. 14 is an illustration view showing a non-limiting example calculation result obtained by calculating colors of a part of vertices of the plurality of polygons constituting the color change image in case of third attitude.

DETAILED DESCRIPTION OF NON-LIMITING EXAMPLE EMBODIMENTS

Figure 1:
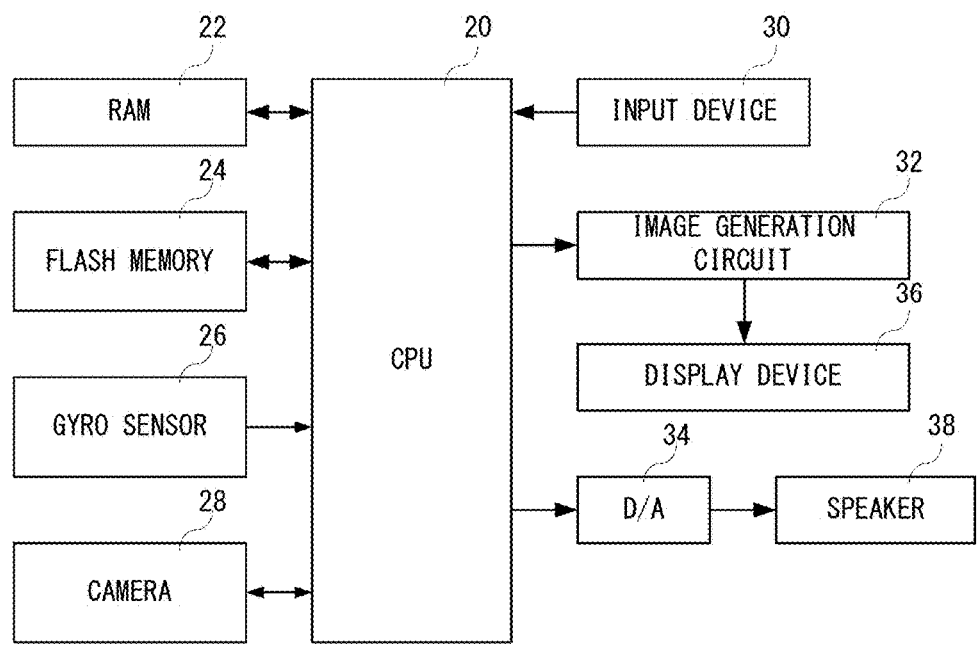
FIG. 1 is a block diagram showing non-limiting example electric structure of a game apparatus.

With referring to FIG. 1, a non-limiting example game apparatus 10 includes a CPU 20, and a RAM 22, a flash memory 24, a gyro sensor 26, a camera 28, an input device 30, an image generation circuit 32 and a D/A converter 34 are connected to the CPU 20. Moreover, a display device 36 is connected to the image generation circuit 32, and a speaker 38 is connected to the D/A converter 34.

For example, the game apparatus 10 of this embodiment is a portable information processing apparatus, but it is not necessary to be limited to a game dedicated machine, and may be a mobile terminal having a game function. A typical example of the mobile terminal having a game function is a feature phone or a smart phone.

The CPU 20 is in charge of overall control of the game apparatus 12. The RAM 22 is a volatile storage medium, and is used as a working memory and a buffer memory for the CPU 20. The flash memory 24 is a nonvolatile storage medium, and is used in order to store an application program such as a game and to store (save) various kinds of data.

However, there is no necessity that an application is limited to a game application, various kinds of application such as a document production application, an email application, a painting application, a character or letter practice application, a linguistic training application, a learning application, etc. are executable.

The gyro sensor 26 detects angular velocities ($\omega x$, $\omega y$, $\omega z$) around respective axes of an X axis, a Y axis and a Z axis as shown in FIG. 2, and inputs detected angular velocities to the CPU 20. However, the angular velocity is converted into digital data from an analog signal when being input to the CPU 20.

Although a housing of the game apparatus 10 is omitted in FIG. 2, a three-dimensional coordinate system is set to the game apparatus 10 (display device 36) in such manner that the X axis is set in a horizontal direction (right and left direction) of the game apparatus 10, the Y axis is set in a front and back direction of the game apparatus 10 (vertical direction to a display surface of the display device 36), and the Z axis is set in a vertical direction (up and down direction) of the game apparatus 10.

Therefore, the gyro sensor 26 detects an angular velocity around an axis in the vertical direction of the game apparatus 10 (an up and down direction of the display device 36), i.e. the Z axis, an angular velocity around an axis in the horizontal direction of the game apparatus 10 (a right and left direction of the display device 36), i.e. the X axis, and an angular velocity around an axis in the front and back direction of the game apparatus 10 (vertical direction to the display surface of the display device 36), i.e. the Y axis. It should be noted that the angular velocity output from the gyro sensor 26 is expressed by an angle by a degree measure (a frequency method), and the rotation around the Z axis is represented by a roll angle, the rotation around the X axis is represented by a pitch angle, and the rotation around the Y axis is represented by a yaw angle. Although a gyro sensor of a piezo-electric vibration type is typically used for this gyro sensor 26, a gyro sensor of other types may be used.

The camera 28 is an imaging device using a CCD or CMOS, and is provided outside a range of the display surface of the display device 36, for example, so that a lens is arranged on the same surface side (the same direction) as the display surface of the display device 36. The camera 28 can also be called an input means (image sensor) in a point of inputting an imaged image to the CPU 20.

The input device 30 are various kinds of push buttons or switches (input means) that are provided on the game apparatus 10, for example, and are used by a player or user (hereinafter, simply called "player") for various kinds of operations such as menu selection and a game operation. However, as the input device 30, instead of the push buttons or switches, or together with the push buttons or switches, an input means such as a pointing device (a touch panel etc.), a microphone, etc. may be provided. Furthermore, the touch panel may be built into the display device 36 described later. The display device 36 in this case is a touch panel integral type display device.

The image generation circuit 32 is used in order to display, under instructions of the CPU 20, various images such as a game image on the display device 36. Although illustration is omitted, the image generation circuit 32 incorporates therein a GPU and a video RAM (VRAM). Moreover, the image generation circuit 32 also incorporates therein a dedicated circuit for performing linear interpolation processing. In the linear interpolation processing, the color value of each point (pixel) in the polygon is interpolated (calculated) from the color values of the respective vertices of the polygon.

The D/A converter 34 converts sound data applied from the CPU 20 into an analog game sound signal, and outputs the same to the speaker 38. In addition, the game sound means a sound signal corresponding to a sound required for the game, such as an imitation sound of a game character or object, sound effect and music (BGM).

In addition, the electric structure of the game apparatus 10 shown in FIG. 1 is a mere example, and it does not need to be limited to this. For example, the camera 28 can be omitted. Moreover, the game apparatus 10 may be provided with a communication module for performing communication with other equipment directly or via a network.

In the above-described game apparatus 10, it is possible to play a game in a three-dimensional virtual space (in a virtual game space). Although detailed description is omitted, in the virtual game space, virtual objects such as plants (including flowers) objects, terrain objects and building objects are provided and a player character is arranged. Moreover, in the virtual game space, there are also arranged non-player characters such as an enemy character, a wild monster character, an opponent's character, a villager character, etc. Furthermore, an item character is arranged in the virtual game space. An image obtained by imaging such a virtual game space with a virtual camera (not shown) is displayed on the display device 36 as a game screen. Specifically, a three-dimensional virtual game space image viewed from a specific viewpoint (virtual camera) is drawn using perspective projection conversion and displayed as the game screen.

In a game of this embodiment, the player can capture (collect) the character of the wild monster by operating the player character and make it a fellow character. Moreover, the player can make the fellow character fight with the character of the monster owned by the enemy character. Furthermore, the player can train (raise) the fellow character and raise its level. For example, an offensive power or/and defensive power can be strengthened. However, the fellow character may evolve (deform) in some cases.

Moreover, the non-player character and the item character as described above also include a predetermined character (object) that is not directly related to a main part of the game. For example, the predetermined object is arranged (hidden) in the virtual game space as a collection element not directly related to the progress of the game, and is collected by the player or the player character. However, the predetermined object may be distributed in response to occurrence of a predetermined event in the game.

A non-limiting example card display screen 100 that is displayed on the display device 36 in the game of this embodiment is shown in FIG. 2. In the card display screen 100, a card object 102 is displayed in a whole range of the display surface. The card object 102 is an example of the above-described predetermined object.

As shown in FIGS. 3A and 3B and FIGS. 4A and 4B, the card object 102 is an object imitating a card that is used in a card game etc. Moreover, even in a game other than the card game, the card object may be one for expressing a page of pictorial books such as a monster, for example while imitating a card. At the center of the card object 102, an image (character image) 104 for the character of the monster is drawn (displayed). Moreover, as described later, a composite image 120 obtained by combining a color change image 106, a background image 108 and a pattern image 110 is drawn (displayed) on a back side of the character image 104. Moreover, in the background image 108, a name area 108a for indicating a name of character (here, "character C"), etc. is displayed (provided) at the lower right position of the character image 104.

As for the card object 102 of this embodiment, when an attitude is changed by tilting the game apparatus 10, a part of the background other than the character image 104 is displayed so as to shine or disappear. Therefore, the display of the card object 102 is changed so as to make the character image 104 look luxurious. Specifically, like an actual card called a hologram card, a kira card, etc., it is possible to produce an appearance that the shining changes depending on a viewing angle.

According to the attitude of the game apparatus 10 (direction of the display surface of the display device 36) and a display position in the card display screen 100, a color of the color change image 106 that constitutes the card object 102 is set. The color change image 106 that the color is set is combined with the background image 108. That is, an image is changed according to a relative positional relationship between the game apparatus 10 (display device 36) and the player in the three-dimensional real space.

As described above, the three-dimensional coordinate system is set to the game apparatus 10 (display device 36), and the angular velocities around the respective three-dimensional axes are detected by the gyro sensor 26, and therefore, the attitude of the game apparatus 10 (display device 36) can be calculated based on the angular velocities around the respective axes that are output from the gyro sensor 26.

Specifically, it is possible to calculate how much of rotation from the reference or predetermined state is based on the angular velocity.

FIGS. 3A and 3B and FIGS. 4A and 4B show a manner that the display of the card object 102 is changed when changing the attitude of the game apparatus 10 gradually. However, in the drawing, a color image is not shown, but expressing a manner that display of the card object 102 is changed due to a change in brightness in gray scale.

Figure 3A:
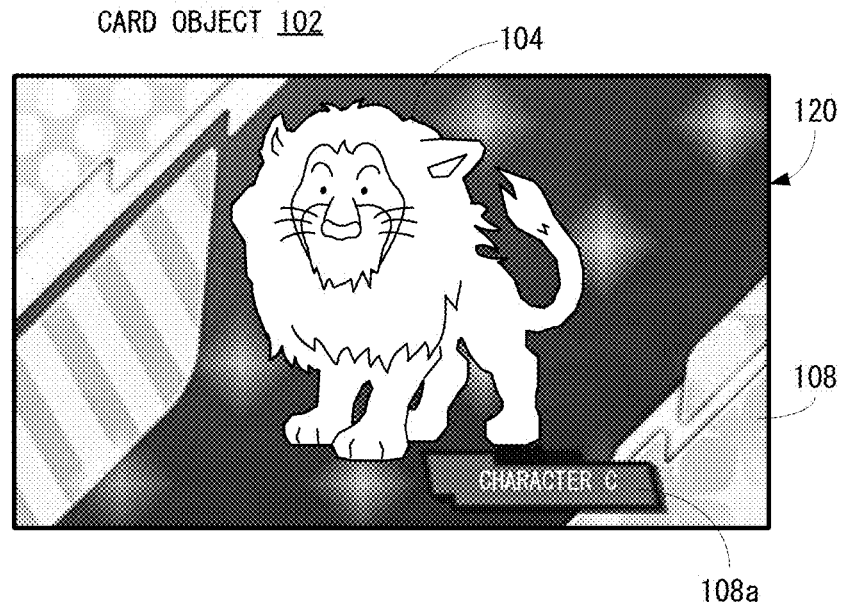
FIG. 3A is an illustration view showing a non-limiting example first display of a card object shown in FIG. 2.
Figure 3B:
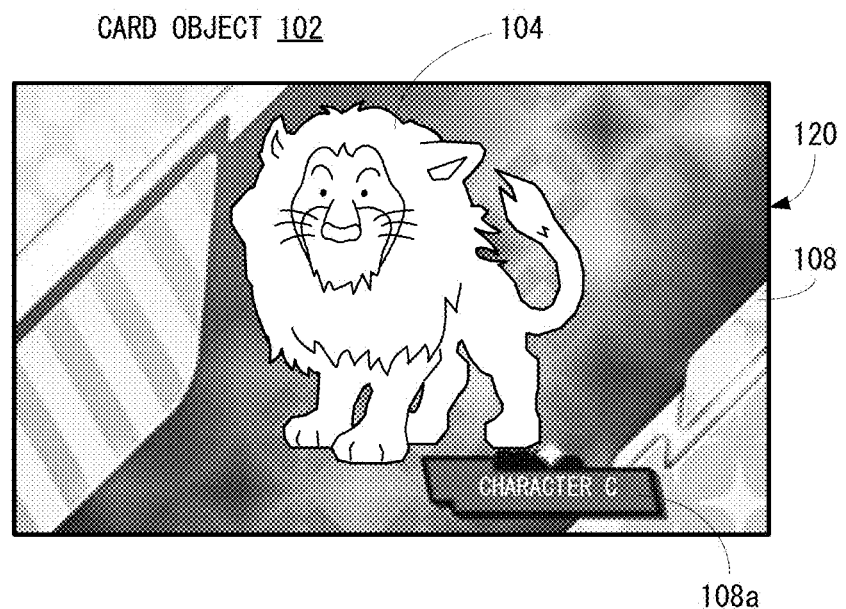
FIG. 3B is an illustration view showing a non-limiting example second display of the card object shown in FIG. 2.

Here, the card object 102 of FIG. 3A is displayed when the attitude of the game apparatus 10 is a first attitude, and the card object 102 of FIG. 3B is displayed at the time of a second attitude, the card object 102 of FIG. 4A is displayed at the time of a third attitude, and the card object 102 of FIG. 4B is displayed at the time of a fourth attitude. In this embodiment, as the attitude of the game apparatus 10, an average value of the angles of the inclination around three axes is used for control. In addition, in another embodiment, a total value may be used for control, or the control is made according to the inclination in each of the three axes.

Although values are only example, the change of the angle from the first attitude to the fourth attitude of the game apparatus 10 is as follows. In the pitch direction around the X axis (gyro angle X), the attitude of the game apparatus 10 is changed so that the angle in the minus direction gradually increases. Specifically, the angle is changed as 1.1 degrees, −0.8 degrees, −7.5 degrees and −8.4 degrees from the first attitude to the fourth attitude. In the yaw direction around the Y axis (gyro angle Y), the attitude of the game apparatus 10 is changed in a manner that after the angle in the minus direction is increased, the angle in the minus direction is made small, and then, the angle in the minus direction is increased. Specifically, the angle is changed as −13.3 degrees, −41.6 degrees, −22.6 degrees and −32.8 degrees from the first attitude to the fourth attitude. Furthermore, in the roll direction around the Z axis (gyro angle Z), the attitude of the game apparatus 10 is changed in a manner that after the angle in the minus direction is increased, the angle in the plus direction is increased. Specifically, the angle is changed as −4.1 degrees, −4.0 degrees, −12.0 degrees and −12.0 degrees from the first attitude to the fourth attitude. The average value (gyro average) of the three angles is changed as −4.1 degrees, −15.5 degrees, −6.0 degrees and −9.8 degrees from the first attitude to the fourth attitude, which value is used to control the determination of the color.

In the card object 102 shown in FIG. 3A, a plurality of regions (rhombus regions) brightened in a rhombus shape (a shape that a square is rotated by 45 degrees) are displayed from the upper right to the lower left in the background image 108 in two lines with the predetermined interval. As will be described later, a color of a whole image is determined by determining the color of each of the vertices of the divided region 106a according to the display position in the color change image 106, and since the color of the background image 108 corresponding to the display position of the vertex of each divided region 106a may be different in some cases, each rhombus region is not necessarily the same brightness.

FIG. 3B shows the image of the card object 102 when the game apparatus 10 is changed from the first attitude to the second attitude.

As understood by comparing FIG. 3A and FIG. 3B, the image of the card object 102 shown in FIG. 3B is brighter than the image of the card object 102 shown in FIG. 3A as a whole, and particularly, the background image 108 is made brighter band-like from the upper right to the lower left. Moreover, in a band-like bright portion, the pattern of the pattern image 110 on the back most side described later rises up.

FIG. 4A shows the image of the card object 102 when the game apparatus 10 is changed from the second attitude to the third attitude.

As understood by comparing FIG. 3B and FIG. 4A, in the image of the card object 102 shown in FIG. 4A, the band-like bright portion of the background image 108 is shifted to the left side in comparison with the image of the card object 102 shown in FIG. 3B. Therefore, in the card object 102 shown in FIG. 4A, a left half is made brighter than a right half. Moreover, in the image of the card object 102 shown in FIG. 4A, in a right end of the band-like bright portion, several rhombus regions are displayed side by side in the back side of the character image 104 in a direction of slant.

FIG. 4B shows the image of the card object 102 when the game apparatus 10 is changed from the third attitude to the fourth attitude.

As understood by comparing FIG. 4A and FIG. 4B, in the image of the card object 102 shown in FIG. 4B, the band-like bright portion of the background images 108 appears right from the center. That is, when the game apparatus 10 is changed from the third attitude to the fourth attitude, the band-like bright portion appears on the right side of the card object 102 after passing through the left side of the card object 102. Therefore, in the card object 102 shown in FIG. 4B, a right half is made brighter than a left half. Moreover, in the image of the card object 102 shown in FIG. 4B, in a left end of the band-like bright portion, several rhombus regions are displayed side by side in the back side of the character image 104 in a direction of slant.

Thus, dependent on the change of the attitude of the game apparatus 10, and the position and brightness of a brighter portion change within the card object 102. Moreover, although not included in the image of the card object 102 shown in FIG. 3A, the band-like bright portion appears in the image of the card object 102 shown in FIG. 3B, and moves as shown in FIG. 4A and FIG. 4B. Therefore, the card object 102 is displayed so as to shine glitteringly and the character image 104 looks luxurious.

The card object 102 includes the character image 104 and the composite image 120 as described above. The composite image 120 is an image that the color change image 106, the background image 108 and the patter image 110 are combined. As shown in FIG. 5, the character image 104 is arranged (drawn) in the front most side. The color change image 106, the background image 108 and the pattern image 110 are arranged at the back side of the character image 104. The pattern image 110 is an image that defines a maximum value of brightness to the color change image 106, and the color values (pixel values) of the color R, G, B of the pixels of the color change image 106 are changed in accordance with the pixel values of the pattern image 110 at the corresponding positions, and the pixel values of the background image 108 are further added thereto become the pixel values of the composite image 120.

Although FIG. 5 is illustrated, for the sake of convenience, in a manner that the color change image 106, the background image 108 and the pattern image 110 are stacked in this order on the back side of the character image 104, since the color change image 106, the background image 108 and the pattern image 110 are combined, such an order does not matter.

For example, the image of the card object 102 is generated by drawing the character image 104, the color change image 106, the background image 108 and the pattern image 110 arranged in different layers in a three-dimensional virtual game space, and by converting the drawn image into the coordinate system of the virtual camera, but may be generated by performing the two-dimensional image processing in the two-dimensional virtual game space.

The character image 104 is an image of a character (game character) imitating a lion in an example of the drawings. However, the character that is displayed on the card object 102 does not need to be limited. For example, a game character imitating another animal or monster, a further type of game character or an animation character may be displayed.

As shown in FIG. 6A and FIG. 6B, the color change image 106 is a rectangular image, and is made somewhat larger than the background image 108 (card object 102). The color change image 106 has a plurality of quadrangular regions (divided regions) 106*a* divided into a lattice shape. In this embodiment, the divided regions 106*a* are arranged with nine (9) in the vertical direction and fifteen (15) in the horizontal direction. Therefore, the color change image 106 includes 135 (9×15) divided regions 106*a*. However, each of the divided regions 106*a* is formed by combining two right triangle polygons. Moreover, in the color change image 106, as for two adjacent divided regions 106*a*, polygons are arranged so that the two adjacent divided regions 106*a* become line symmetry with respect to a line (side) that the same are in contact to each other. Based on the color value calculated according to an equation described later, a color is attached to each of the vertices of each polygon. For a portion other than the vertices, the color can be determined by the interpolation processing from the colors of the vertices as a function of the general GPU.

In addition, although an outline of the divided region 106*a* is indicated in black in order to show intelligibly the color change image 106 and the divided region 106*a* in FIG. 6A and FIG. 6B, in fact, the outline is also indicated by a color attached to the polygon.

Moreover, as shown in FIG. 6B, in the color change image 106, when noting 2×2 divided regions 106*a*, the nine (9) vertices are classified into one (1) vertex (vertex of a first classification) in a position that is surrounded by eight (8) vertices and the vertices (vertices of a second classification) in the other position. However, the vertices of the second classification are the above-described eight vertices surrounding the vertex of the first classification. In FIG. 6B, the vertex of the first classification is indicated by a white circle (white dot), and the vertices of the second classification is indicated by a black circle (black dot).

In this embodiment, as for the vertex of the first classification and the vertex of the second classification, parameters to be set in the equation for calculating the color are changed. That is, the vertex of the first classification and the vertex of the second classification are different from each other in a correspondence relationship. However, since the color of each of the vertices is also changed with the attitude of the game apparatus 10, it is possible to say that a correspondence relationship of the color corresponding to the attitude and the classification of each vertex differs. That is, a plurality of correspondence relationships of the color are set. By doing in this way, the whole image does not change uniformly, but a state where a part of the image stands out strikingly or becomes invisible in a specific situation occurs, whereby a higher directive effect can be obtained.

This is for making the card object 102 shine glitteringly and the character image 104 look luxurious by changing the color of the color change image 106 and thus by changing the color (brightness) of the composite image 120.

Furthermore, in this embodiment, since the display position of each vertex in the card object 102 is also taken into consideration when calculating the color of each of the vertices of the divided region 106*a*, the display position of each vertex is expressed (managed) by two-dimensional coordinates. As shown in FIG. 6B, a two-dimensional coordinate system is set to the color change image 106, a horizontal direction of the color change image 106 is a direction of an X axis, and a vertical direction of the color change image 106 is a direction of a Y axis. Moreover, as shown in FIG. 6B, a direction toward right of the color change image 106 is a plus direction of the X axis, and a direction downward of the color change image 106 is a plus direction of the Y axis. Furthermore, the vertex at the upper left of the color change image 106 is set as the origin (0, 0). Moreover, the coordinates of the vertex at the lower right of the color change image 106 are set as (14, 8).

Therefore, the coordinates of the vertices of the above-described first classification are (1, 1), (3, 1), (5, 1), (7, 1), (9, 1), (11, 1), (13, 1), (1, 3), (3, 3), (5, 3), (7, 3), (9, 3), (11, 3), (13, 3), (1, 5), (3, 5), (5, 5), (7, 5), (9, 5), (11, 5), (13, 5), (1, 7), (3, 7), (5, 7), (7, 7), (9, 7), (11, 7), and (13, 7), and the coordinates of the vertices of the second classification are the coordinates except the coordinates of the vertex of the above-described first classification among (0, 0)-(14, 8).

Figure 7A:
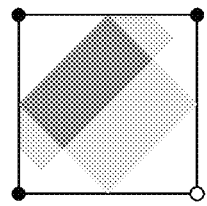
FIG. 7A is an illustration view showing a non-limiting example pattern that is attached to a divided region included in a pattern image.

The pattern image 110 is the same size as the color change image 106, and includes a plurality of divided regions 110a. The divided region 110a has the same size and the same shape as the divided region 106a of the color change image 106. As shown in FIG. 7A, a predetermined pattern is attached to the divided region 110a. The gray having different concentration is attached to this predetermined pattern. Moreover, in the pattern image 110, as shown in FIG. 7B, the predetermined pattern is attached to each divided region 110a so as to become symmetry in both the upper and lower direction and the right and left direction in the adjacent divided regions 110a.

Figure 7B:
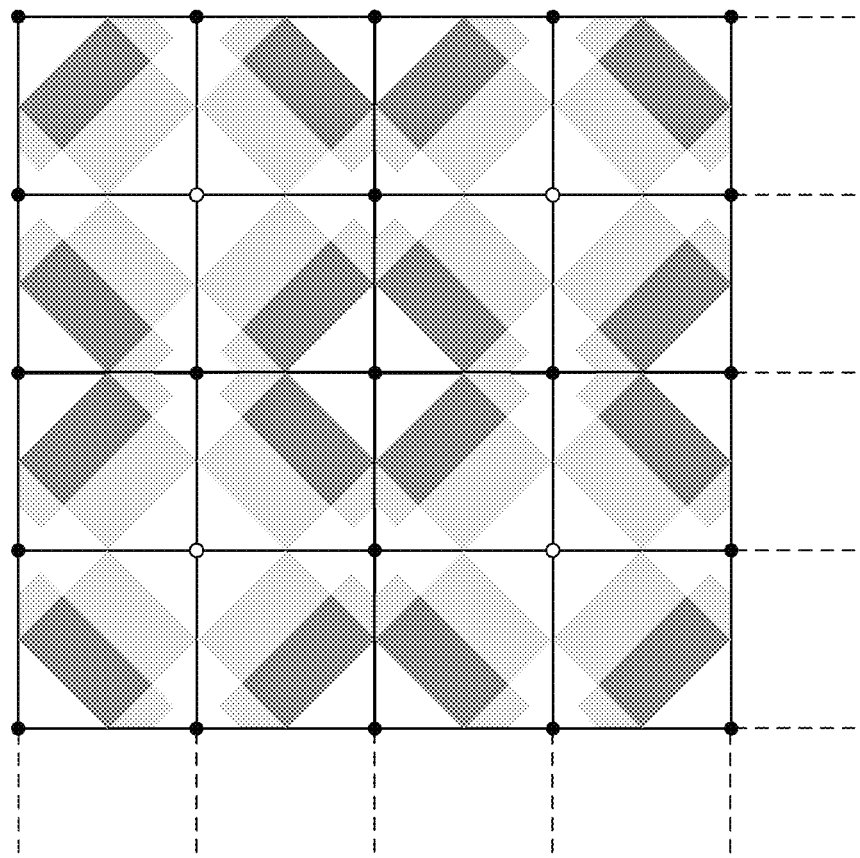
FIG. 7B is an illustration view showing some patterns of the pattern image.

In addition, a line segment that divides the divided regions 110a, and the vertex of the first classification and the vertex of the second classification are indicated in the pattern image 110 in FIG. 7A and FIG. 7B in order to show how the pattern is attached corresponding to the color change image 106, but these are not displayed in fact.

Thus, the character image 104 is displayed on the front of the composite image 120, and the composite image 120 is an image obtained by combining the color change image 106, the background image 108 and the pattern image 110, and therefore, when the color of the color change image 106 changes, the brightness of a part of the background image 108 changes, and further, the pattern of the pattern image 110 rises up.

In this embodiment, each color value Val of the color R, G, B of each of the vertices is calculated according to the equation 1. However, in the equation 1, the parameters to be set differ according to whether it is a vertex of the first classification or a vertex of the second classification and the color R, G or B of the color value Val to be calculated. It should be noted that the parameter is acquired from a parameter table (see FIG. 8) that is set in advance.

$$\mathrm{Val} = A * \cos\theta + A + \mathrm{Min}$$

$$A = (\mathrm{Max} - \mathrm{Min})/2$$

$$\theta = f * \mathrm{Deg} + isou\_x * x + isou\_y * y + isou \quad \text{[Equation 1]}$$

here, A denotes an amplitude of the cosine function, Max denotes a maximum value of $A*\cos\theta$, Min denotes a minimum value of $A*\cos\theta$, f denotes a coefficient for setting a frequency of color change and Deg denotes a gyro angle. This coefficient f is the wave number of the cosine waveform (the number of times the wave goes up and down) during the gyro angle Deg is rotated once. Moreover, the gyro angle Deg is converted into an angle (phase) by multiplying the coefficient f. However, in this embodiment, an average value of the gyro angle X, the gyro angle Y and the gyro angle Z is used for the gyro angle Deg according to the parameter table.

Moreover, isou_x is a coefficient for converting the X coordinate of the vertex that the color value Val is to be calculated into an angle (phase), and isou_y is a coefficient for converting the Y coordinate of the vertex concerned into a phase. In addition, isou is an initial phase of the cosine function.

As shown also in the equation 1, the color value Val is determined using a trigonometric function that is changed cyclically. Moreover, the phase θ (theta) of trigonometric function is determined based on the gyro angle Deg and the position (x, y) of the vertex. Therefore, the color value is calculated so as to change according to a transition that is determined in advance in accordance with the attitude of the game apparatus 10 and the position (display position) in the color change image 106. However, if the display position in the color change image 106 differs even when the attitude of the game apparatus 10 is not changed, a color is changed cyclically. Moreover, if the attitude of the game apparatus 10 is changed even when the display position in the color change image 106 is the same, a color is changed cyclically. That is, even if it is a vertex of the same classification, the color value Val of each of the color R, G, B is changed cyclically according to differences in the attitude of the game apparatus 10 or/and the display position in the color change image 106.

In addition, as shown in the equation 1, a reason why the amplitude A and the minimum value Min are added in an equation for calculating the color value Val is in order to attach no color when the color value Val is equal to or less than a predetermined value (in this embodiment "0"). However, in this embodiment, when not attaching a color, the color value is set to "0". Moreover, the color value Val is calculated between "0"-"1", and this is converted into a numerical value (8-bit data) of "0"-"255". For example, when all the color values of the color R, G, B of the vertex are "0", black is set (attached) to this vertex. Moreover, when all the color values of the color R, G, B of the vertex are "255", white is set to this vertex. Therefore, as each color value of R, G, B increases, the color of the vertex approaches white and becomes brighter.

FIG. 8 shows the above-described parameter table. Specific numerical values in the parameter table are an example selected (determined) through tests by developers in order to display the card object 102 in a manner that the card object 102 shines, like a glittering card.

For example, when calculating the color value Val of the color R about the vertex of the first classification, according to the parameter table, the average value of three gyro angles is used in the equation 1, whereby "−1" is set as the minimum Min, "0.2" is set as the maximum Max, "30" is set as the coefficient f, "60" is set as the initial phase isou, "80" is set as coefficient isou_x, and "80" is set as coefficient isou_y.

Moreover, when calculating the color value Val of the color G about the vertex of the second classification, according to the parameter table, the average value of three gyro angles is used in the equation 1, whereby "−1.6" is set as the minimum Min, "0.5" is set as the maximum Max, "50" is set as the coefficient f, "240" is set as the initial phase isou, "15" is set as coefficient isou_x, and "10" is set as coefficient isou_y.

In addition, although description is omitted, the parameters according to the classification of the vertex and the color are set in the equation for other cases as similar to the above-described case.

Figure 9:
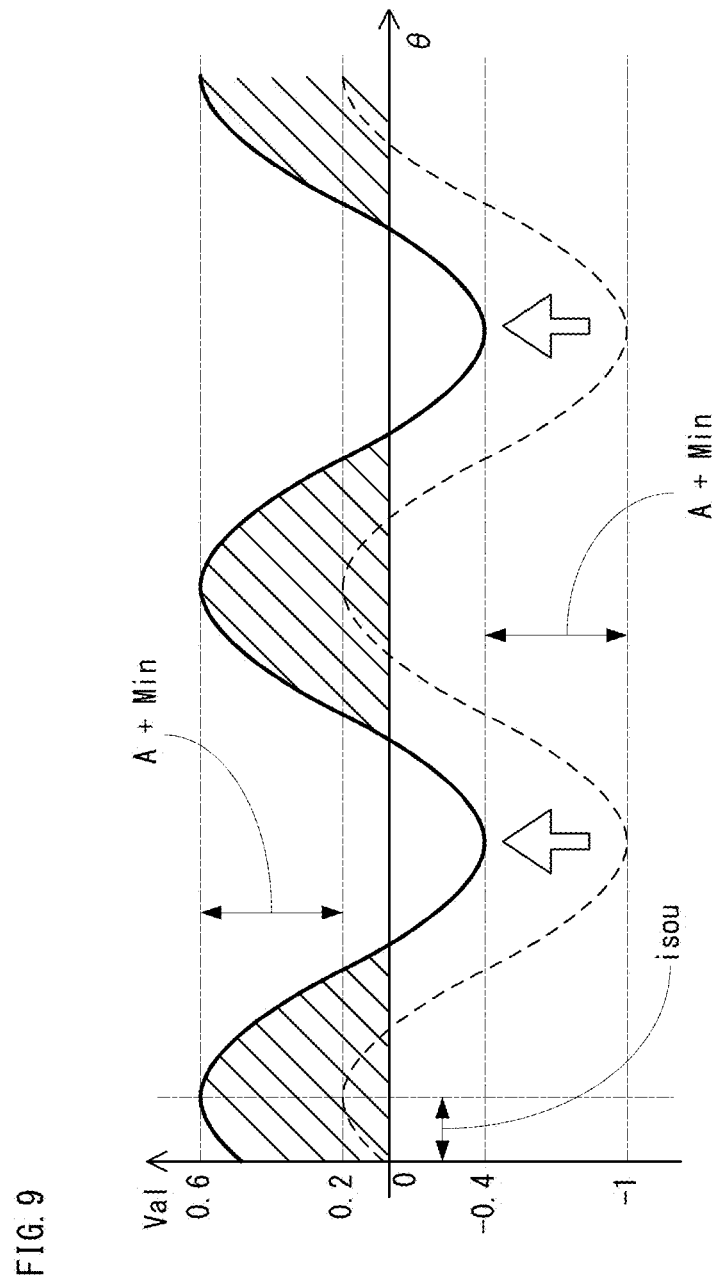
FIG. 9 is a waveform chart showing a part of a non-limiting example change of a color value with respect to a phase when setting a certain parameter.

FIG. 9 is a waveform chart showing a part of an example of a change of a color value Val with respect to a phase θ (theta) when setting parameters to the equation 1 according to the parameter table. In this waveform, the amplitude A is calculated using the maximum value Max and the minimum value Min, and the color value Val is determined according to the value of the phase θ. However, among the parameters for determining the phase θ, the coefficient f, the initial phase isou, the coefficient isou_x, and the coefficient isou_y are also acquired from the parameter table.

As shown also in the equation 1, the waveform (cosine waveform) is translated toward the plus side (upward) by an amount determined by the amplitude A and the minimum value Min. In FIG. 9, it is indicated by a white arrow mark that a parallel displacement of the waveform is performed.

As described above, since the color value Val is 0-1, in the waveform shown in FIG. 9, a color corresponding to each color value Val of the color R, G, B is attached to a vertex located at the coordinates (x, y) when the phase θ falls within a range of the hatched portion. However, in this embodiment, even when the color value Val is less than 0, the color value Val is determined to be 0. In this case, since a state where the color value is 0 continues in a predetermined range, it is possible to set so that a color cyclically appears or disappears. Thus, by setting the above-described parameter, not only a sine wave but various patterns that change cyclically are realizable.

FIG. 10-FIG. 12 show tables (tables of a calculation result) indicating the color value of the color R, G, B of each of the vertices of each divided region 106a (polygon) in the color change image 106 calculated according to the equation 1, when the card object 102 shown in FIG. 3A is displayed. Corresponding to the coordinates of each of the vertices, each color value of the color R, G, B is described in the calculation result table. However, in the calculation result table, each color value is described as a value obtained by converting the color value Val into a numeral value in "0"-"255". Moreover, vertices having the X coordinate of "6", "8" and "10" and the Y coordinate of "0"-"9" are omitted since all the color values of the color R, G, B are "0".

In FIG. 10-FIG. 12, vertices having color values of the hatched color R, G, B correspond to the center point of the rhombus region shown in FIG. 3A. As shown in FIG. 10 and FIG. 11, all the color values of the color R, G, B are the same at the coordinates (3, 7), (5, 5) and (7, 3) of the vertices. Moreover, as shown in FIG. 11 and FIG. 12, all the color values of the color R, G, B are the same at the coordinates (7, 7), (9, 5), (11, 3) and (13, 1) of the vertices. However, even if the color values of the color R, G, B of a plurality of vertices are all the same in the color change image 106, if the color values of corresponding positions (pixels) in the background image 108 and the pattern image 110 differ, the color and the brightness of the pixel corresponding to each of the vertices in the composite image 120 differ.

In addition, although illustration is omitted, the color value of the color R, G, B of each of the vertices of each divided region 106a in the color change image 106 is calculated about the card object 102 shown in FIG. 3B, FIG. 4A and FIG. 4B in a similar manner.

For example, FIG. 13 shows a part of the calculation result table indicating the color value of the color R, G, B of each of the vertices of each divided region 106a in the color change image 106 calculated according to the equation 1, when the card object 102 shown in FIG. 3B is displayed.

Moreover, FIG. 14 shows a part of the calculation result table indicating the color value of the color R, G, B of each of the vertices of each divided region 106a in the color change image 106 calculated according to the equation 1, when the card object 102 shown in FIG. 4A is displayed.

FIG. 13 and FIG. 14 show the calculation results of the color values about vertices having the X coordinates of "5"-"8" and the Y coordinates of "0"-"8" in the color change image 106.

As shown in FIG. 13, in case of the image of the card object 102 of FIG. 3B, since an attitude is changed from the first attitude to the second attitude, when noting a vertex (5, 5), the color value of the color R, G, B is changing (decreasing), for example. Therefore, it is understood that even if it is the same display position (coordinates), the color of the color change image 106 changes when an attitude changes. Therefore, the color (brightness) of the card object 102 also changes.

Moreover, although omitted in FIG. 10-FIG. 12, at the first attitude, all the color values are "0" in the rows with the X coordinate of "6" and of "8", as shown in FIG. 13, at the second attitude, in the row with the X coordinate of "6", the color values of a part of the color G and a part of the color B are larger than "0", and in the row with the X coordinate of "8", the color values of all the color G and most of the color B are larger than "0". Moreover, in also the row with the X coordinate of "7", in a part thereof, the color values are changed to values larger than "0".

At the second attitude, the row with the X coordinate of "6"-"8" corresponds to a part of the band-like bright portion of the image of the object card 102 shown in FIG. 3B, and it is understood also from the calculation result of the color value that the band-like bright portion appears in response to the change from the first attitude to the second attitude.

Moreover, in case of the image of the card object 102 of FIG. 4A, as shown in FIG. 14, since an attitude is changed from the second attitude to the third attitude, when noting the row with the X coordinate of "5", it is understood that the color value is changed in part to a value larger than "0".

Moreover, when noting the row with the X coordinate of "6", although the color value of the color R is not changed, the color values of the color G and the color B that were approximately "0" at the second attitude change to values larger than "0", and the color values of the color G and the color B that were values larger than "0" change to "0".

Furthermore, when noting the row with the X coordinate of "7", the color values with the Y coordinate of "6"-"8" were values larger than "0" at the second attitude, but change to "0" on the whole. Moreover, when noting the row with the X coordinate of "8", although the color value of the color R is not changed, the color values of the color G and the color B that were values larger than "0" at the second attitude change to "0" on the whole.

In the third attitude, the band-like bright portion is moved to a left side in comparison with a case of the second attitude, so that in the image of the card object 102 shown in FIG. 4A, a portion corresponding to the row with the X coordinate of "6"-"8" becomes slightly darker in comparison with a case of the second attitude. This can also be understood from the above-described calculation result of the color value.

Figure 15:
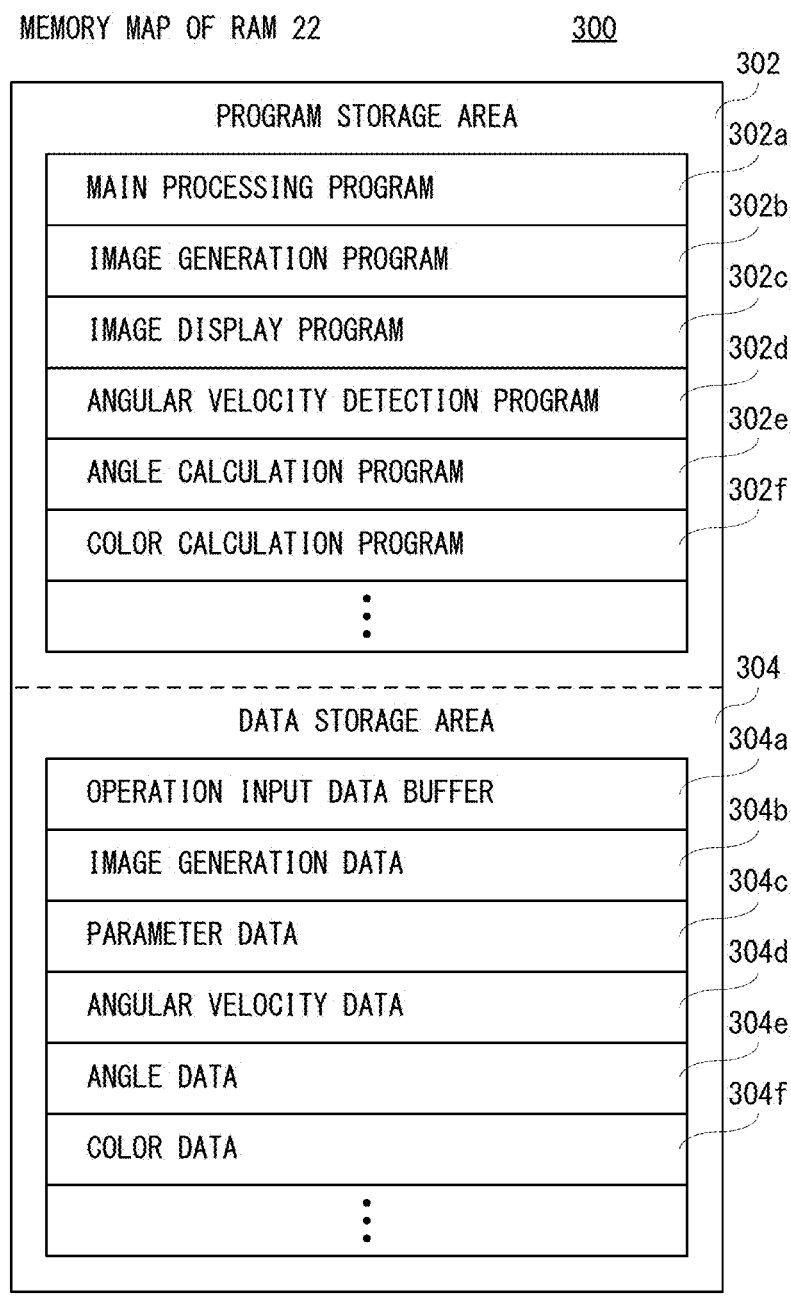
FIG. 15 is an illustration view showing a non-limiting example memory map of a RAM incorporated in the game apparatus shown in FIG. 1.

FIG. 15 is an illustration view showing a non-limiting example memory map 300 of the RAM 22 of the game apparatus 10 shown in FIG. 1. As shown in FIG. 15, the RAM 22 includes a program storage area 302 and a data storage area 304. The program storage area 302 is stored with an information processing program such as an application program of the game of this embodiment, and the information processing program, includes a main processing program 302a, an image generation program 302b, an image display program 302c, an angular velocity detection program 302d, an angle calculation program 302e, a color calculation program 302f, etc.

The main processing program 302a is a program for processing a main routine of game processing of the game of this embodiment. The image generation program 302b is a program for generating data (game image data) of game images (a game screen, a card display screen 100, etc.) using image generation data 304b. The image display program 302c is a program for outputting the game image data generated according to the image generation program 302b to the display device 36. Therefore, the game image corresponding to the game image data is displayed on the display device 36.

The angular velocity detection program 302d is a program for detecting angular velocity data 304d about the angular velocities around respective axes that are output from the gyro sensor 26, and for storing the same in the data storage area 304. The angle calculation program 302e is a program for calculating angle data 304e using the angular velocity data 304d detected according to the angular velocity detection program 302d. Specifically, the angle calculation program 302e calculates respective angles (gyro angle) in the pitch direction, the yaw direction and the roll direction from the angular velocity data 304d, calculates an average value of three angles, and stores angle data 304e corresponding to the average value in the data storage area 304.

The color calculation program 302f is a program for calculating the color values of the color R, G, B of each of the vertices of each divided region 106a of the color change image 106, respectively. According to this color calculation program 302f, as described above, the parameters according to the first classification and the second classification are set to the equation 1 in accordance with the parameter table, and using the equation 1 having been set with the parameters, the color value Val of the color R, G, B of each of the vertices is calculated. Therefore, the calculation result table as described above is obtained.

Although illustration is omitted, the program storage area 302 is also stored with other programs such as a program for saving (storing) game data (save data) in the flash memory 24, a sound outputting program for generating and outputting sounds required for the game, etc.

The data storage area 304 is provided with an operation input data buffer 304a. Moreover, the data storage area 304 is stored with the image generation data 304b, the parameter data 304c, the angular velocity data 304d, the angle data 304e, the color data 304f, etc.

The operation input data buffer 304a is an area for temporarily storing operation data from the input device 30. When received by the CPU 20, the operation data is stored in the operation input data buffer 304a in time series, and is erased when used for the processing of the CPU 20.

The image generation data 304b includes image data for generating the game image data, such as polygon data, texture data, etc. The parameter data 304c is data for the parameter table shown in FIG. 8.

The angular velocity data 304d is data of the angular velocity about a pitch angle, a yaw angle and a roll angle output from the gyro sensor 26. The angle data 304e is data about the average value of respective angles in the pitch direction, the yaw direction and the roll direction calculated based on the angular velocity data 304d. The color data 304f is data of the color value about the color R, G, B of the vertex of each divided region 106a (polygon) of the color change image 106. Specifically, this is data about the calculation result table as shown in FIG. 10-FIG. 12.

Although illustration is omitted, the data storage area 304 is stored with other data, and provided with a flag(s) and a counter(s) (timer(s)) required for the game processing (information processing).

Figure 16:
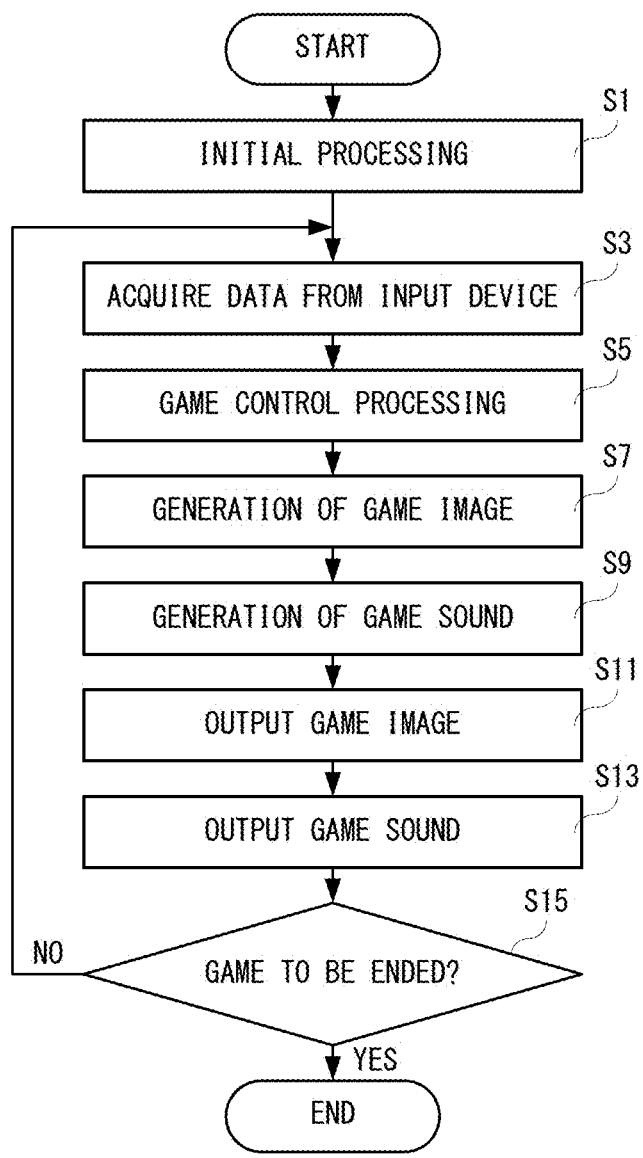
FIG. 16 is a flow chart showing non-limiting example game processing of a CPU incorporated in the game apparatus shown in FIG. 1.

FIG. 16 is a flow chart showing a non-limiting example entire processing by the CPU 20 that is provided in the game apparatus 10 shown in FIG. 1.

In addition, processing of respective steps of flowchart of FIG. 16 (also in FIG. 17 and FIG. 18) are mere example, and if the same or similar effect (result) is obtained, an order of the steps may be exchanged. Moreover, in this embodiment, basically, it is assumed that the CPU 20 executes the processing of each step of the flowcharts shown in FIG. 16-FIG. 18; however, some steps may be executed by a processor(s) or a dedicated circuit(s) other than the CPU 20.

If the power supply of the game apparatus 10 is turned on, prior to executing the entire processing, the CPU 20 executes a boot program stored in a boot ROM not shown, whereby respective units such as the RAM 22 can be initialized. Then, the game program stored in the flash memory 24 etc. is read and written in the RAM 22, and execution of the game program concerned is started by the CPU 20.

As shown in FIG. 16, if the game processing is started, the CPU 20 performs initial processing in a step S1. In the initial processing, for example, the CPU 20 constructs a virtual game space for generating and displaying the game image, arranges respective characters or objects such as the player object 102 appearing in this virtual space in initial positions, and arranges virtual objects appearing in the game space, such as the ground object, the building objects, the plants objects, etc. in predetermined positions. Furthermore, the CPU 20 sets initial values of the various parameters to be used in the game processing.

Subsequently, the CPU 20 acquires various kinds of data transmitted from the input device 30 in a step S3, and performs game control processing in a step S5. For example, the CPU 20 moves a player character or/and makes a player character perform an arbitrary action according to the operation data. Moreover, the CPU 20 moves an enemy character or/and makes the enemy character perform an arbitrary action, without following the operation data. Furthermore, the CPU 20 determines victory or defeat or ranking of the player character or/and determines the game clear or game over. Furthermore, the CPU 20 moves a position or/and direction of a virtual camera according to the operation data. However, normally, the virtual camera is arranged in the virtual space so as to gaze at the player character and follow the player character while maintaining a predetermined distance, and when changing the position or/and direction by instructions of the player, the virtual camera is arranged in a position or/and direction after changed.

In a next step S7, the CPU 20 and the GPU perform generation processing of the game image for displaying on the display device 36. Briefly described, the CPU 20 and the GPU read data representing a result of the game control processing in the step S5 from the RAM 22, and read data necessary for generating the game image from the VRAM to generate a game image. For example, when generating the game image, under instructions of the CPU 20, the GPU arranges the player character at a current position in the virtual space, and arranges a non-player character such as the enemy object. Furthermore, the GPU arranges (generates) the virtual object according to the current position of the player character. Therefore, a certain scene (sight) is generated. An image (imaged image) that this scene is viewed from the virtual camera is generated as the game image. Moreover, when displaying the card display screen 100 as described above as the game image, color calculation processing of a card as shown in FIG. 17 is performed in this step S7.

Subsequently, in a step S9, a game sound is generated. For example, the game sound is a sound required for the game, such as a voice (imitative voice) of the player character, a sound effect, BGM, etc. Then, the image data corresponding to the game image is output to the display device 36 in a step S11, and the game sound is output to the speaker 38 via the D/A converter 34 in a step S13. Therefore, while the game image is displayed on the display device 36, the game sound is output from the speaker 38.

Then, the CPU 20 determines in a step S15 whether the game is to be ended. Determination in the step S15 is performed, for example, based on whether the game is over or whether the player gives an instruction to stop the game. If "NO" is determined in the step S15, that is, if not ending the game, the process returns to the step S3. If "YES" is determined in the step S15, that is, if ending the game, the game processing is terminated.

Figure 17:
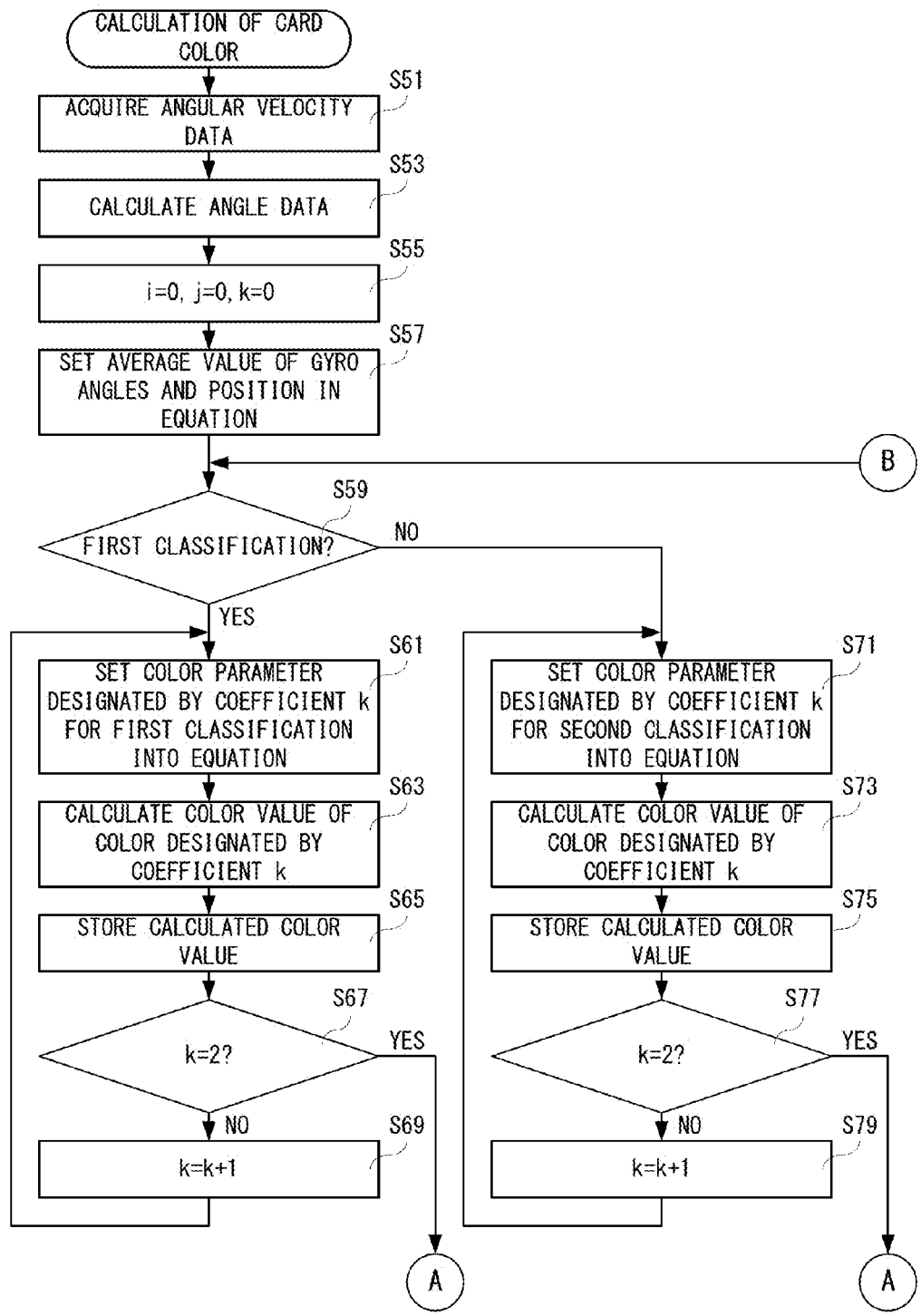
FIG. 17 is a flow chart showing a part of non-limiting example color calculation processing of the CPU incorporated in the game apparatus shown in FIG. 1.
Figure 18:
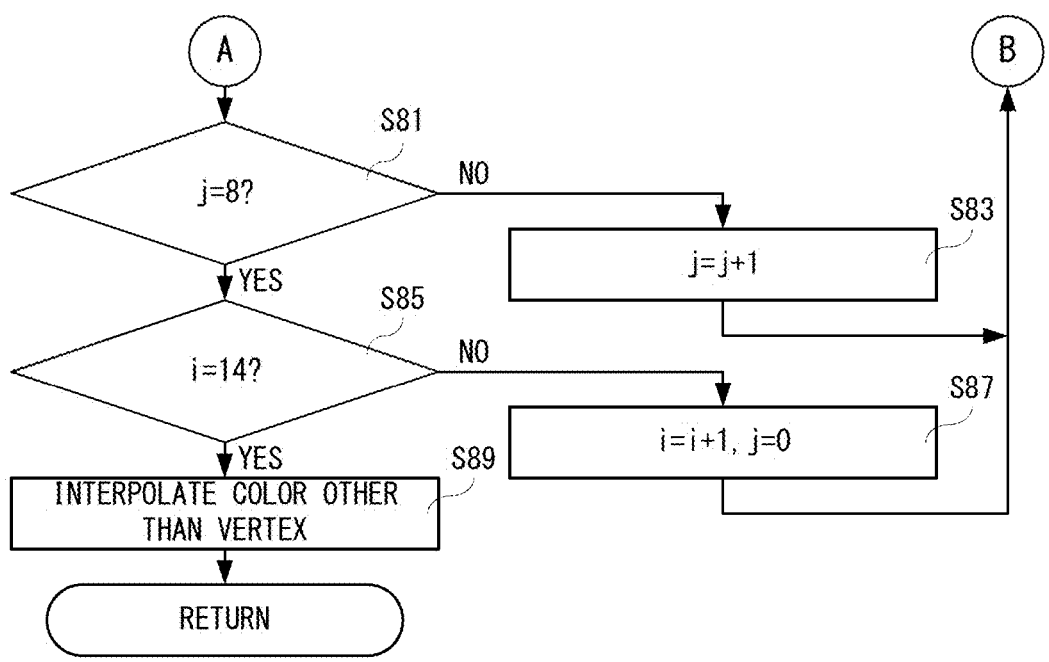
FIG. 18 is a flow chart showing another part of the non-limiting example color calculation processing of the CPU incorporated in the game apparatus shown in FIG. 1, following FIG. 17.

FIG. 17 and FIG. 18 are flow charts showing a non-limiting example color calculation processing performed in the game image generation processing in the step S7 shown in FIG. 16. As described above, this color calculation processing is performed by the CPU 20 when generating the game image for the card display screen 100.

As shown in FIG. 17, when color calculation processing is started, the CPU 20 acquires, in a step S51, the angular velocity data 304d for each of the pitch angle, the yaw angle and the roll angle output from the gyro sensor 26, and stores in the data storage area 304. In a next step S53, the angle data 304e is calculated and stored in the data storage area 304. Here, with reference to the angular velocity data 304d, the CPU 20 expresses the angles of the pitch direction, the yaw direction and the roll direction with a degree measure, and calculates the average value of the three angles (gyro angles). Data corresponding to this average value is the angle data 304e.

Subsequently, in a step S55, a variable i, a variable j and a variable k are initialized (i=0, j=0, k=0). However, the variable i and the variable j are variables for designating the two-dimensional coordinates of each vertex of the color change image 106, and the variable i corresponds to the X coordinate (X component) and the variable j corresponds to the Y coordinate (Y component). Therefore, in the step S55, the coordinates (0, 0) of the vertex at the upper left of the color change image 106 are designated. Moreover, the variable k is a variable for designating a color, and in this embodiment, k=0 corresponds to the color R, k=1 corresponds to the color G, and k=2 corresponds to the color B.

In a next step S57, the average value of the gyro angles and the position are set in the equation 1. However, the gyro angle is indicated by the angle data 304e calculated in the step S53. Moreover, as described above, the position is designated by the variable i and the variable j. Then, in a step S59, it is determined whether it is the vertex of the first classification. Here, the CPU 20 determines whether the coordinates designated by the variable i and the variable j are coordinates of the vertex of any one of a plurality of vertices shown with white circles in FIG. 6B. The coordinates of a plurality of vertices indicated by white circles are as described above and stored in the data storage area 304, for example.

If "YES" is determined in the step S59, that is, if it is the vertex of the first classification, in a step S61, a parameter of a color that is determined by the variable k for the first classification is set in the equation 1, and the color value of the color that is designated by the variable k is calculated in a step S63, and the calculated color value is stored in a step S65. However, in the step S65, the color value Val that is calculated in the step S63 is stored after converted into the numerical value of 0-255 (8-bit data). Moreover, in the step S65, for the coordinates (i, j), data of the color value of the color designated by the variable k is stored as a part of the color data 304f in the data storage area 304. These are the same also for a step S75 described later.

Then, it is determined, in a step S67, whether the variable k is "2". If "YES" is determined in the step S67, that is, if the variable k is "2", it is determined that the color value of the color R, G, B of the vertex designated by the coordinates (i, j) have been calculated, and the process proceeds to a step S 81 shown in FIG. 18. On the other hand, if "NO" is determined in the step S67, that is, if the variable k is not "2", in a step S69, the variable k is incremented (k=k+1), and the process returns to the step S61. Therefore, the calculation processing of the color value for next color G or B is performed.

Moreover, if "NO" is determined in the step S59, that is, if it is the vertex of the second classification, in a step S71, a parameter of a color that is determined by the variable k for the second classification is set in the equation 1, and the color value of the color that is designated by the variable k is calculated in a step S73, and the calculated color value is stored in a step S75.

Then, it is determined, in a step S77, whether the variable k is "2". If "YES" is determined in the step S77, that is, if the variable k is "2", the process proceeds to the step S81. On the other hand, if "NO" is determined in the step S77, that is, if the variable k is not "2", in a step S79, the variable k is incremented, and the process returns to the step S71.

As shown in FIG. 18, in the step S81, it is determined whether the variable j is "8". That is, the CPU 20 determines whether the color values for all the vertices indicated by the X coordinate indicated by the variable i have been calculated. If "NO" is determined in the step S81, that is, if the variable j is not "8", the variable j is incremented (j=j+1) in a step S83, and the process returns to the step S59 shown in FIG. 17. Therefore, the color value calculation processing of the vertices of a next column in the same row is executed. On the other hand, if "YES" is determined in the step S81, that is, if the variable j is "8", it is determined whether the variable i is "14" in a step S85. That is, the CPU 20 determines whether the color values for all the vertices (135 pieces) included in the color change image 106 have been calculated. Specifically, the CPU 20 determines whether the calculation result table is completed.

If "NO" is determined in the step S85, that is, if the variable i is not "14", the variable i is incremented (i=i+1) and "0" is set to the variable j (j=0) in a step S87, and the process returns to the step S59. Therefore, the color calculation processing for the vertex of each column in a next row is executed. On the other hand, if "YES" is determined in the step S85, that is, if the variable i is "14", it is determined that the color values have been calculated for all the vertices, and in a step S89, a color other than the vertex of the polygon is interpolated in a dedicated circuit of the image generation circuit 32, and the process returns to the game processing (game image generation processing in the step S 7) shown in FIG. 16. Therefore, the color according to the calculated color value is attached to each of the vertices of each divided region 106a (polygon), and the color change image 106 that the colors other than each of the vertices are interpolated is generated, and the image of the card object 102 is generated. Then, the card display screen 100 as shown in FIG. 2 is displayed on the display device 36.

According to this embodiment, since the color of the color change image is cyclically changed in accordance with the attitude of the game apparatus and the position of each vertex of each divided region in the color change image, it is possible to display the game image so as to shine glitteringly in accordance with the relative positional relationship between the display device and the player. Therefore, for example, it is possible to display the card object that looks like a glittering card. Thus, it is possible to show the character such as a game character displayed on the card object luxuriously according to the way of viewing of the player.

In addition, although the composite image that combines the background image, the color change image and the pattern image each being the two-dimensional image is generated and the card object that the composite image is arranged on the back side of the character image is displayed on the display device, it does not need to be limited to this. For example, a card object includes the character image, the color change image, the background image and the pattern image may be drawn (generated) in a three-dimensional virtual game space, converted into screen coordinates, and displayed on the display device.

Moreover, although the card object is displayed so as to shine glitteringly in this embodiment, it does not need to be limited to this. Only the background of the game image may be displayed as glittery, and the character or object that is desired to express gorgeously is displayed on the front of the background.

Furthermore, although the attitude of the game apparatus or the display device is detected based on the output of a gyro sensor in this embodiment, it does not need to be limited to this. For example, instead of the gyro sensor, an acceleration sensor can be used. Since a method of detecting the attitude of the game apparatus based on acceleration is known, a detailed description is omitted. Moreover, an image sensor can be also used. In such a case, if a face of the player that uses the game apparatus is recognized from an image that is imaged by a camera, a position or attitude (direction) of the game apparatus (display device) with respect to the face of the player can be detected. In such a case, for example, a case where the player is facing (directly facing) the game apparatus (display device) is supposed as the reference position of the game apparatus (display device), and the position or attitude of the game apparatus (display device) can be detected. On the contrary, the image may be changed according to the position when the player moves the face while not moving the game apparatus (display device). In any case, it is possible to change the image according to the relative positional relationship between the display device and the player. That is, the display changes depending on the way of viewing from the player, and it is possible to express luxurious looks like an actual hologram card or a kira card.

Furthermore, although the angle about each axis of the three axes is detected using a three axes gyro sensor in this embodiment, it is not necessary to be limited to this. The angle around any one axis or any two axes may be detected. However, when detecting the angles around the two axes, an average value thereof is used for calculation of the color value.

Furthermore, in this embodiment, in order to set the colors of the color change image so as to be changed by the transition that is determined in advance in accordance with the attitude of the game apparatus and the position of each vertex of each divided region in the color change image, the cosine function that changes cyclically is used, but it does not need to be limited to this. As long as the color changes so as to transition, other mathematical functions or other algorithms can be used. As an example of other functions, a sine function can be used. Moreover, as long as it is a cyclically changing function, for example, a function of another waveform such as a cycloid or a triangular wave can be used.

Although the brightness of the background image on the back side of the character image is changed in this embodiment, not only the background image but also a part of the character image may be changed in brightness. In such a case, for example, it is possible to make a part of the character image transparent or translucent so that the change in the brightness of the background image appears in that part. Alternatively, a part of the character image may be displayed as a background image, and the brightness of the background image may be changed. In this way, for example, a part of the body of the character, a decorative item worn by the character, a weapon or an item possessed by the character, etc. can be shiny with the background.

Furthermore, although this embodiment is explained on a case where a portable game apparatus or portable terminal is used for game play, it is needless to say that other portable terminal such as a notebook PC, a PDA, a tablet PC, etc. can also be used.

Moreover, not limited to the portable game apparatus or the like, it is possible to us other equipment such as a stationary type game apparatus, desktop PC, etc. However, when using other equipment such as a stationary type game apparatus, desktop PC, etc., the color value of the color change image is changed according to that the player changes an attitude of a controller.

Therefore, in such a case, a gyro sensor is incorporated in the controller (input device). However, changing the attitude of the controller may include operating a direction input key such as a joystick or a cross key provided in the controller. In such a case, the gyro sensor is unnecessary.

Moreover, when the display device is provided on the controller that is communicably connected to game apparatus via a cable or wirelessly, a predetermined image such as a card object may be displayed on the display device so as to shine brightly on the basis of the attitude of the controller or the display device provided in the controller concerned.

In addition, the content of the game, the structure of the game apparatus and the specific numerical values are mere exemplification, and should not be limited, and can be changed suitably according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer readable storage medium storing an information processing program executable by a computer of an information processing apparatus configured to display a first image on a display, wherein the information processing program, when executed, is configured to cause one or more processors of the computer to at least:
- calculate an attitude of an apparatus that a user operates;
- control a color for a display object so as to change according to a predetermined transition in accordance with an attitude and a display position or a position within the display object, the color being controlled to change cyclically according to the attitude and the display position or the position within the display object; and
- generate the first image including the display object,
- wherein the color control includes setting the color to a phase based on a sine function or a cosine function that adds a parameter indicating the attitude and the display position or the position within the display object, and
- wherein the color control does not set the color when a value of a sine function or a cosine function is equal to or less than a predetermined value.

2. The storage medium according to claim 1, wherein the color control includes setting the color based on a predetermined transition for each color component.

3. The storage medium according to claim 1, wherein the generation of the first image includes generating a second image of a character in addition to the display object.

4. The storage medium according to claim 1, wherein the generation of the first image includes generating the first image so that a third image is combined with the color that is set in the color control with respect to the display object.

5. A non-transitory computer readable storage medium storing an information processing program executable by a computer of an information processing apparatus configured to display a first image on a display, wherein the information processing program, when executed, is configured to cause one or more processors of the computer to at least:
- calculate an attitude of an apparatus that a user operates;
- control a color for a display object so as to change according to a predetermined transition in accordance with an attitude and a display position or a position within the display object; and
- generate the first image including the display object,
- wherein the display object is constituted of a polygon model in a virtual space, and
- wherein the color control includes determining a color of each of plural vertices of polygons of the display object based on the predetermined transition and determining colors of other portions through interpolation between vertices.

6. The storage medium according to claim 5, wherein a plurality of correspondence relationships of a color corresponding to the attitude and a vertex position are determined, and the color control includes determining the color corresponding to the attitude and the vertex position based on one of the correspondence relationships determined for each vertex.

7. The storage medium according to claim 6, wherein the correspondence relationship is set so that the color is cyclically changed based on the attitude and the vertex position, and among the plurality of correspondence relationships, at least two of the correspondence relationships are different in a frequency of a color change.

8. The storage medium according to claim 1, wherein the apparatus that the user operates is the information processing apparatus.

9. An information processing apparatus configured to display a first image on a display, the information processing apparatus comprising:
- at least one processor configured to at least:
  - calculate an attitude of an apparatus that a user operates;
  - control a color for a display object so as to change according to a predetermined transition in accordance with an attitude and a display position or a position within the display object, the color being controlled to change cyclically according to the attitude and the display position or the position within the display object; and
  - generate the first image including the display object,
- wherein the color control includes setting the color to a phase based on a sine function or a cosine function that adds a parameter indicating the attitude and the display position or the position within the display object, and
- wherein the color control does not set the color when a value of a sine function or a cosine function is equal to or less than a predetermined value.

10. An information processing system configured to display a first image on a display, the information processing system comprising:
- at least one processor configured to at least:
  - calculate an attitude of an apparatus that a user operates;
  - control a color for a display object so as to change according to a predetermined transition in accordance with an attitude and a display position or a position within the display object, the color being controlled to change cyclically according to the attitude and the display position or the position within the display object; and
  - generate the first image including the display object,
- wherein the color control includes setting the color to a phase based on a sine function or a cosine function that adds a parameter indicating the attitude and the display position or the position within the display object, and
- wherein the color control does not set the color when a value of a sine function or a cosine function is equal to or less than a predetermined value.

11. An information processing method of a computer that displays a first image on a display portion, the method comprising:
(a) calculating an attitude of an apparatus that a user operates;
(b) controlling a color for a display object so as to change according to a predetermined transition in accordance with an attitude and a display position or a position within the display object, the color changing cyclically according to the attitude and the display position or the position within the display object; and
(c) generating the first image including the display object,
- wherein the color control includes setting the color to a phase based on a sine function or a cosine function that adds a parameter indicating the attitude and the display position or the position within the display object, and
- wherein the color control does not set the color when a value of a sine function or a cosine function is equal to or less than a predetermined value.

12. The information processing apparatus according to claim 9, wherein the color is set based on a predetermined transition for each color component.

13. The method according to claim 11, wherein (b) includes setting the color based on a predetermined transition for each color component.

14. An information processing method of a computer that displays a first image on a display portion, the method comprising:

(a) calculating an attitude of an apparatus that a user operates;
(b) setting a color for a display object so as to change according to a predetermined transition in accordance with an attitude and a display position or a position within the display object, the color changing cyclically according to the attitude and the display position or the position within the display object; and
(c) generating the first image including the display object,
wherein the display object is constituted of a polygon model in a virtual space, and
wherein (b) includes determining a color of each of plural vertices of polygons of the display object based on the predetermined transition and determining colors of other portions through interpolation between vertices.

15. The method according to claim 14, wherein a plurality of correspondence relationships of a color corresponding to the attitude and a vertex position are determined, and (b) includes determining the color corresponding to the attitude and the vertex position based on one of the correspondence relationships determined for each vertex.

* * * * *